(12) United States Patent
Godse

(10) Patent No.: US 6,202,091 B1
(45) Date of Patent: Mar. 13, 2001

(54) PROCESS AND APPARATUS FOR INITIALIZING A COMPUTER FROM POWER UP

(75) Inventor: Dhananjay Godse, Kanata (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/986,783

(22) Filed: Dec. 8, 1997

(51) Int. Cl.[7] .......................... G06F 15/177; G06F 13/38

(52) U.S. Cl. ............................. 709/222; 709/220; 713/2

(58) Field of Search .................................. 709/200, 203, 709/217, 218, 219, 220, 221, 222; 713/2, 1, 100

(56) References Cited

U.S. PATENT DOCUMENTS

| | | | |
|---|---|---|---|
| 5,452,454 | * 9/1995 | Basu | 713/2 |
| 5,819,107 | * 10/1998 | Lichtman et al. | 713/2 |
| 5,838,910 | * 11/1998 | Domenikos et al. | 709/203 |
| 5,842,011 | * 11/1998 | Basu | 713/2 |

OTHER PUBLICATIONS

"IPL a Remote LAN Workstation Using OS/2 and NET-BIOS", IBMTDB vol. 33, 8 (NN910198), Jan. 1998.*
"Multiple Bootable Operating System", IBMTDB vol. 35, 1A (NA9206311) pp. 311–314, Jun. 1992.*
"Support of Multiple initial Microcode Load Images on Personal Computer DIskettes", IBMTDB vol. 36, 10 pp. 47–54, Oct., 1993.*

* cited by examiner

Primary Examiner—Mark Rinehart
Assistant Examiner—Paul Kang

(57) ABSTRACT

The present invention relates to a method and apparatus to permit a computer to boot from power up from its own memory units or from a network. The booting process is divided into the five stages of start-up, discovery, software download, software initialization and datafill. A boot ROM directs the stages in the booting process and the policy governing each of these five stages is laid out in a policy file. Each of the stages may be driven by the computer node's local memory unit, such as a local hard disk or non-volatile RAM), or from a software system downloader and configuration manager situated elsewhere in an ATM network where the computer node resides. A failure recovery procedure is also provided to allow the computer to revert to other means in case of failure during the booting process. The invention also provides a machine readable medium comprising a program element to implement the novel boot-up procedure.

27 Claims, 12 Drawing Sheets

PROCESS AND APPARATUS FOR INITIALIZING A COMPUTER FROM POWER UP

FIELD OF THE INVENTION

This invention relates to a process and apparatus for starting up a computer system. It is applicable to computers operating in a distributed network environment and may be used to allow the individual computers to boot selectively from a local memory unit or from a network through the use of a policy file. The invention also provides a computer readable storage medium containing a program element to direct a computer to boot-up.

BACKGROUND

Booting is the process by which software (usually the operating system) is loaded into the memory of a computer and begins execution. Booting may also include loading a software image and starting software instances such as accounting or mail daemons. Usually, booting is done when the computer is turned on. Different computer systems can boot in different fashions. For example, most PCs are able to boot their operating system from a disk containing the required booting software and many embedded systems are able to boot from a pre-configured boot ROM. One type of network organization method involves using diskless workstations attached to a server that contains software programs and data. Diskless workstations are able to boot from a network using a connection protocol such as the TCP/IP protocol suite and download the programs in order to run them remotely. In these systems the elements of the TCP/IP protocol suite must also be fetched from a remote source and the booting is usually done from an IP network.

In a typical system, when a computer is first turned on, code present in a boot ROM is executed. Typically this code directs the computer to check for hardware components to ensure no essential components are lacking in the system. The boot ROM code then proceeds in loading up the operating system software. In the majority of computer systems, the booting procedure is hard-coded. For instance, a computer that boots from its hard disk always boots from its hard disk and one that boots from a network always boots from a network. Modifying the booting procedure involves reprogramming the boot ROM. Therefore if the hard drive of computer that boots from its hard drive fails, the computer cannot start although the same software could be available from the network. The reverse is also true for a computer that usually boots from the network when the latter fails.

Thus, there exists a need in the industry to provide an improved method for booting a computer such as to allow greater flexibility and to permit a computer to selectively boot from either its non-volatile memory unit or from a remote location, such as from a network.

OBJECTS AND STATEMENT OF THE INVENTION

An object of the invention is to provide a machine-readable storage medium containing an improved program element to boot-up a computer.

An object of this invention is to provide a novel method for booting-up a computer.

Yet another object of the invention is to provide a computer implementing a novel boot-up procedure.

As embodied and broadly described herein the invention provides a machine-readable storage medium containing a program element for directing a computer to effect a multi-stage boot-up procedure from power-up, said multi-stage boot-up procedure including at least two successive stages, said program element implementing functional blocks, including:
a boot element for initiating one stage of said boot-up procedure;
a data structure including a pointer to a location containing an information element, said boot element capable of interacting with said information element to cause execution of a stage of said boot-up procedure following in order said one stage, said pointer being selectively settable to point to either one of a local site and a remote site.

For the purpose of this specification, the expression "local site" refers to a location that is in the computer itself or, generally speaking, part of the computer. For example, a disk drive either internal or external is considered local because it is integrated to the structure of the computer. On the other hand, "remote site" is considered a location holding components that are not normally part of the computer, but with which the computer may be able to communicate. For example, a node in a network to which the computer is connected is considered to be "remote" because the node is normally a separate device from the computer, although the computer can communicate with that node through a pre-determined protocol to exchange data.

For the purpose of this specification, the expression "vintage of a file" or "vintage" is used to designate the age or time characteristics of a file that indicates whether the file is up to date or not.

For the purpose of this specification, the expression "non-volatile storage" is used to designate a storage unit that maintains its content even if the storage device has no power such as non-volatile RAM (NVRAM) or a hard-disk.

In accordance with the present invention, the machine-readable storage medium holds a program element implementing a boot-up procedure. That procedure is characterized as being a multi-stage process. A data structure containing a pointer that can be selectively set to point toward a local site or a remote site indicates the location of software or data components necessary to complete the execution of one or more of the boot-up procedure stages. In a specific example, this provides a flexible booting strategy allowing initiating the boot-up procedure locally while loading some software components from a remote site, such as a network. The components that one may select to load from the remote location can be those that may be the subject of repeated upgrades or revisions. This avoids the necessity of changing the boot-up program at each node of the network, as an upgrade at the server that delivers the particular component is sufficient.

In a most preferred embodiment, the boot-up procedure includes five stages, namely start-up, discovery, software download, software initialization and datafill. Several files contain instructions indicating to the boot-up program how to proceed, in particular, where data or software components necessary for the execution of the various stages are located. In addition, a file may also point to an alternate resource location should the primary site from which the data or software component is to be obtained is inoperative.

The start-up stage initiates the boot-up procedure. The CPU of the computer, upon power-up, begins executing from a boot initiation element a set instructions starting at a particular address of a non-volatile memory. The purpose of the boot initiation element is to run basic sanity checks to determine all the critical components of the computer that are present, run the necessary I/O drivers and communication protocols, etc. In other words, the boot initiation element activates software components and sets-up the hardware to allow other software elements necessary to complete the boot-up procedure to run properly. The boot initiation element interacts with a policy file containing a plurality of entries that determine specifically how the boot-up procedure will be completed. Typically, the policy file that can be either held on a non-volatile memory or be part of the boot initiation element includes one or more pointers specifying where a particular information element such as software or data entities are to be acquired. In a most preferred embodiment, the policy file specifies when the discovery stage is to be performed. In short, the discovery stage is a registration of the computer system with the network. This involves setting up a data exchange transaction with a given node in the network to indicate to that node that a particular computer is being boot up. A successful registration procedure indicates that reliable communication with the network is likely. Accordingly, software or data elements that may be needed to complete the boot-up procedure can be acquired from that source. Otherwise, if the registration procedure is not successful, the boot initiation element may then revert solely to local resources since the network is not accessible.

The next step of the boot-up process is the software download stage that involves downloading basic software from the network or locating that software in a local resource, as specified by the policy file. Typically, the software download process is a process whose purpose is to acquire the bulk of the operating system. The policy file specifies from where the files must me acquired. A software load may also be present to describe what files need to be acquired. Once this stage is completed, the necessary executable files permitting to activate the operating system will be present in the computer memory.

The software initialization step follows next. In essence, the purpose of this stage is to begin execution of the files acquired during the previous stage in a particular order specified by a software initialization file. At this stage, the policy file indicates from where the software initialization file is to be obtained. Once this stage is completed, the files of the operating system are active in memory and ready to execute their respective tasks.

The datafill is the last stage of the boot-up procedure and includes the introduction of configuration data into the software instances. Here, data elements necessary for the proper operation of the operating system files are fetched from a datafill file and dispatched to the intended recipients. As was the case from the previous stages, the policy file indicates from where the datafill file is to be obtained.

As embodied and broadly described herein, the invention also provides a method for effecting a boot-up procedure of a computer, said boot-up procedure including first and second successive stages, said method comprising the steps of:

a) providing a data structure including a pointer to a location containing an information element, said pointer being selectively settable to point to either one of a local site and a remote site;

b) initiating the first step of said boot-up procedure;

c) processing said data structure to determine a location of said information element;

d) accessing said information element at the location determined at step c;

e) processing said information element to cause execution of said second stage of said boot-up procedure.

As embodied and broadly described herein, the invention also provides a computing apparatus, comprising:

a processor;

a memory holding a program element for directing said processor to execute a multi-stage boot-up procedure of said computing apparatus, said multi-stage boot-up procedure including at least two successive stages, said program element implementing a boot element for initiating one stage of said boot-up procedure;

a data structure in said memory, said data structure including a pointer to a location containing an information element, said boot element capable of interacting with said information element to cause execution of a stage of said boot-up procedure following in order said one stage, said pointer being selectively settable to point to either one of a local site and a remote site.

As embodied and broadly described herein, the invention also provides a machine-readable storage medium containing a program element for directing a computer to effect a boot-up procedure from power-up, said program element implementing a boot element for initiating said boot-up procedure, said boot element capable of interpreting data stored in a certain file during execution of said boot-up procedure, said boot element providing means to establish a data exchange transaction between the computer and a remote site to verify a vintage of said file.

Under an example embodying this particular aspect of this invention, the boot initiation element is capable of verifying the vintage of any one of the files that direct the execution of the boot-up procedure, namely the policy file, the software download file, the software initialization file and the datafill file. In short, the verification procedure involves the steps of communicating any suitable characteristic of the file such as its date of creation or its date at which it was last modified to a remote reference site, such as a node in the network. If the file is up to date, the reference site notifies the boot initiation element accordingly, and the latter utilizes the file contents to complete the execution of the boot-up procedure. On the other hand, if the file is no longer up to date, and a new version exists, the reference center then transmits the new file to the boot initiation element that replaces the old file by the new one.

As embodied and broadly described herein the invention also provides a method for effecting a boot-up procedure of a computer, said method comprising the steps of:

a) providing a file in said computer containing data elements, said data elements influencing execution of said boot-up procedure;

b) initiating a data exchange transaction with a remote site to determine a vintage of said file; and c) completing said boot-up procedure.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

The present invention is concerned with a process that allows a computer to boot selectively from its own local non-volatile memory unit or from a network. In the preferred embodiment of this invention, when a local non-volatile memory unit is available, the system uses a policy file located in the non-volatile memory unit. The policy file directs each stage of the booting process independently, which allows for greater flexibility during the booting process. Preferably, the policy file is easily modified to reflect the system changing requirements. Furthermore, failure recovery mechanisms allow the computer to revert to an alternative booting scheme. For example, in the case where a local non-volatile memory unit is in failure or not available, the computer can wait for the system manager to send the booting instructions through the network. These features and others will become apparent following the description in the sections that follow.

Figure 1:
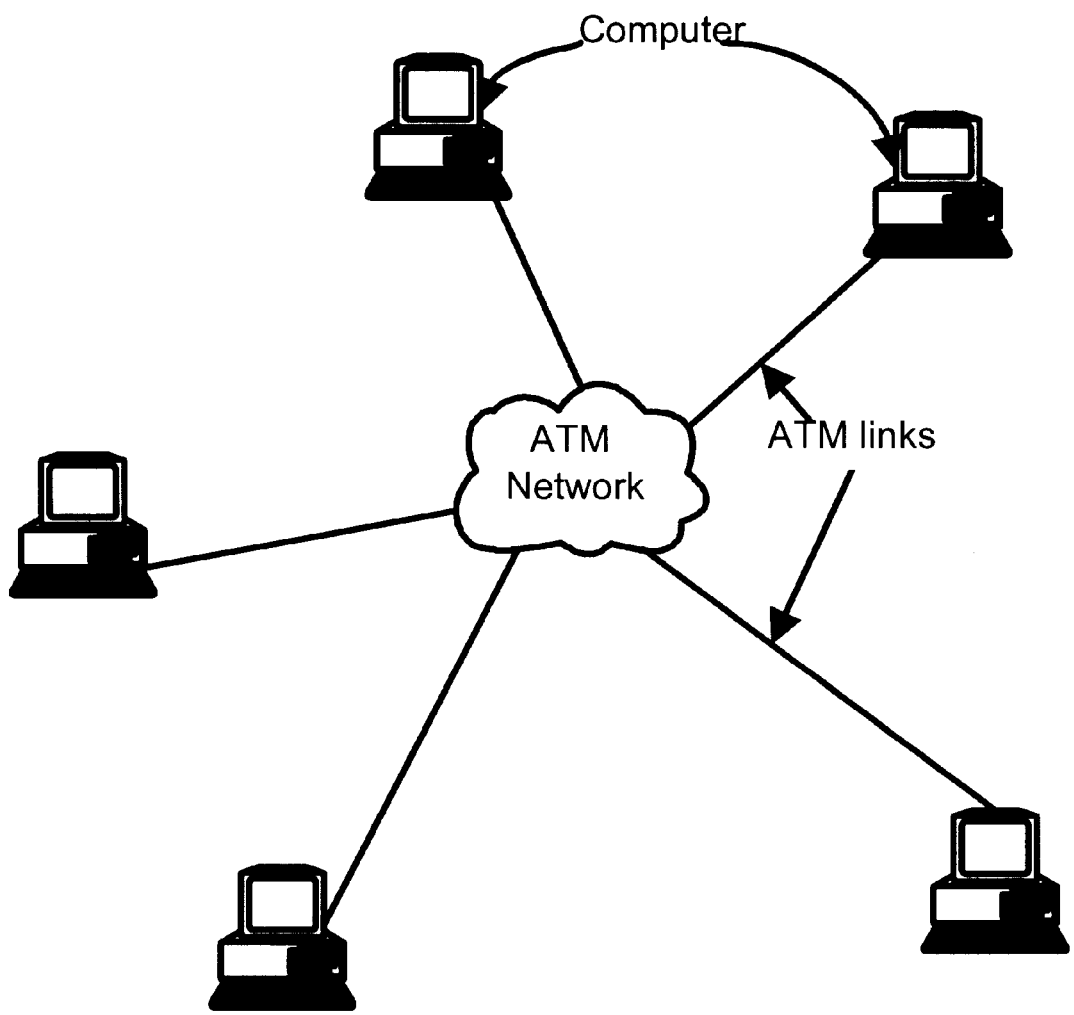
FIG. 1 shows a distributed computing network where the process in accordance with this invention can be implemented.

Computers that may make use of the booting method in accordance with this invention may be used in stand-alone mode or be of a distributed nature, as shown in FIG. 1. These machines, herein designated as nodes, may reside in geographically remote locations and communicate using a set of predefined protocols. Protocols such as TCP/IP, client/server architecture and message passing are all possible methods of achieving a distributed computing environment. For more information on distributed processing, the reader is invited to consult Operating Systems by William Stallings, Prentice Hall $2^{nd}$ edition 1995. The text of this document is included hereby by reference.

Figure 2:
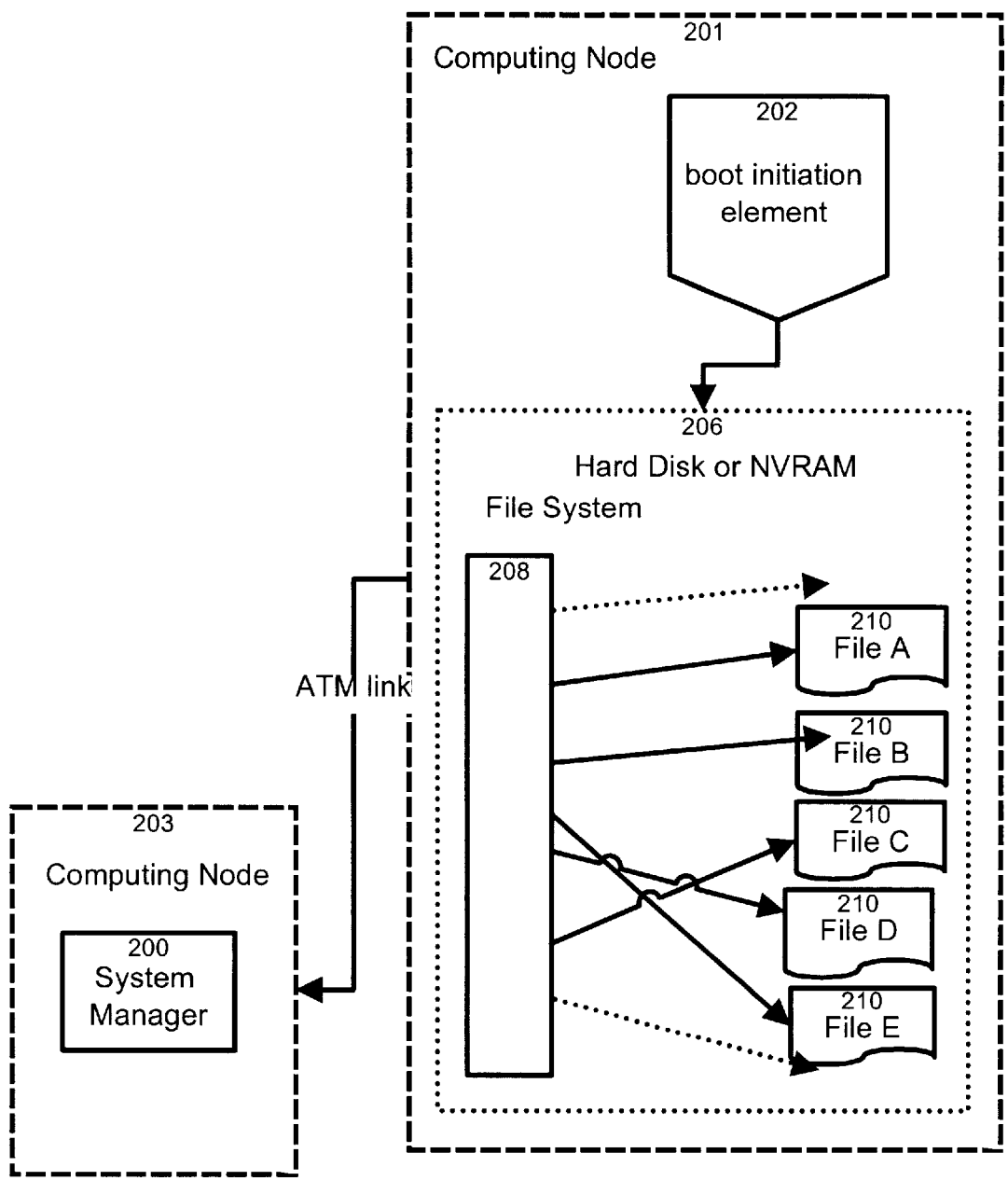
FIG. 2 shows a computing node consistent with the spirit of the invention connected via an ATM link to a system manager unit.

In the preferred embodiment of this invention, as illustrated in FIG. 2, the computing node to be booted 201, herein referred to as the new computing node, is in a computer network comprising a system manager entity 200. Preferably, the new computing node 201 and the node including the system manager 203 communicate through an ATM link or other network connection. The new computing node comprises a boot initiation element software module 202 and may include a hard disk or a non-volatile RAM (NVRAM) unit 206.

The boot initiation element 202 is the first piece of code that is executed when the computer powers on. Preferably, the code begins at an address of the memory that is the default address loaded in the code segment of the CPU upon power-up. Thus, when the CPU is energized and becomes operational it begins executing the instructions of the boot initiation element. The boot initiation element includes software allowing the computer to perform a network boot namely an ATM driver allowing it to communicate with the system manager, software to run basic sanity checks on the system, software providing a simple communication protocol and software to download information from the network such as Trivial File Transfer Protocol (TFTP). Furthermore, the boot initiation element includes instructions to check for a hard drive and a non-volatile RAM module (NVRAM) 206 and code to interpret the file system 208. Preferably, the same algorithm is used whether the computer node is a disk-based or diskless computer.

The file system 208 comprises a series of files used in the booting process as well as pointers to these files to allow the boot initiation element 202 to access them. In the preferred embodiment, the file system includes a policy file, a status file, an initialization script file, a datafill file and software load files. Each of these files and their purpose will be described in detail later in this specification. The structure of the file system may vary across implementations and variations in the number of files or in the structure of the file system do not detract from the spirit of the invention.

Figure 3:
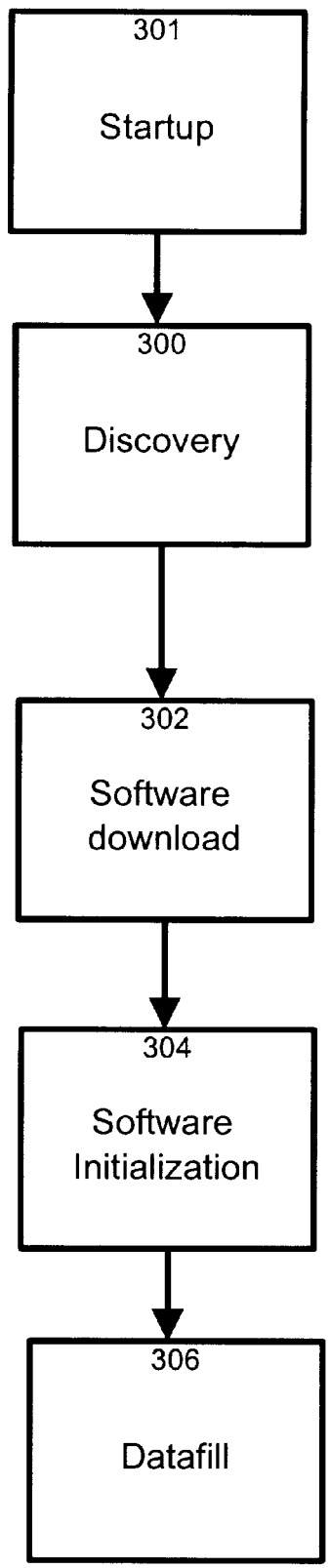
FIG. 3 shows five stages of the booting process in accordance with the spirit of the invention.

In the most preferred embodiment of this invention, the booting process is divided into five stages, as illustrated in FIG. 3, namely start-up 301, discovery 300, software download 302, software initialization 304 and datafill 306. Each stage may be driven either from the local hard drive (or NVRAM) or from the system manager on the network depending on the instructions in a policy file.

In a preferred embodiment the policy file is a file comprising a set of entries that control the booting process. It is located in the hard drive or other non-volatile memory unit and is accessible via the filing system 208. The main advantage of having the policy file in the hard drive is that the policy file may be easily re-configured by the network manager according to the changing requirements of the network. Alternatively, the policy file may be part of the boot initiation element 202. A role of the policy file is to specify if software or data entities are to be acquired from the remote system manager through the network or from a local memory unit such as a hard drive or an NVRAM unit. Before each stage in the booting process shown in FIG. 3, the policy file is examined in order to determine if the stage must be run locally or remotely.

Figure 4:
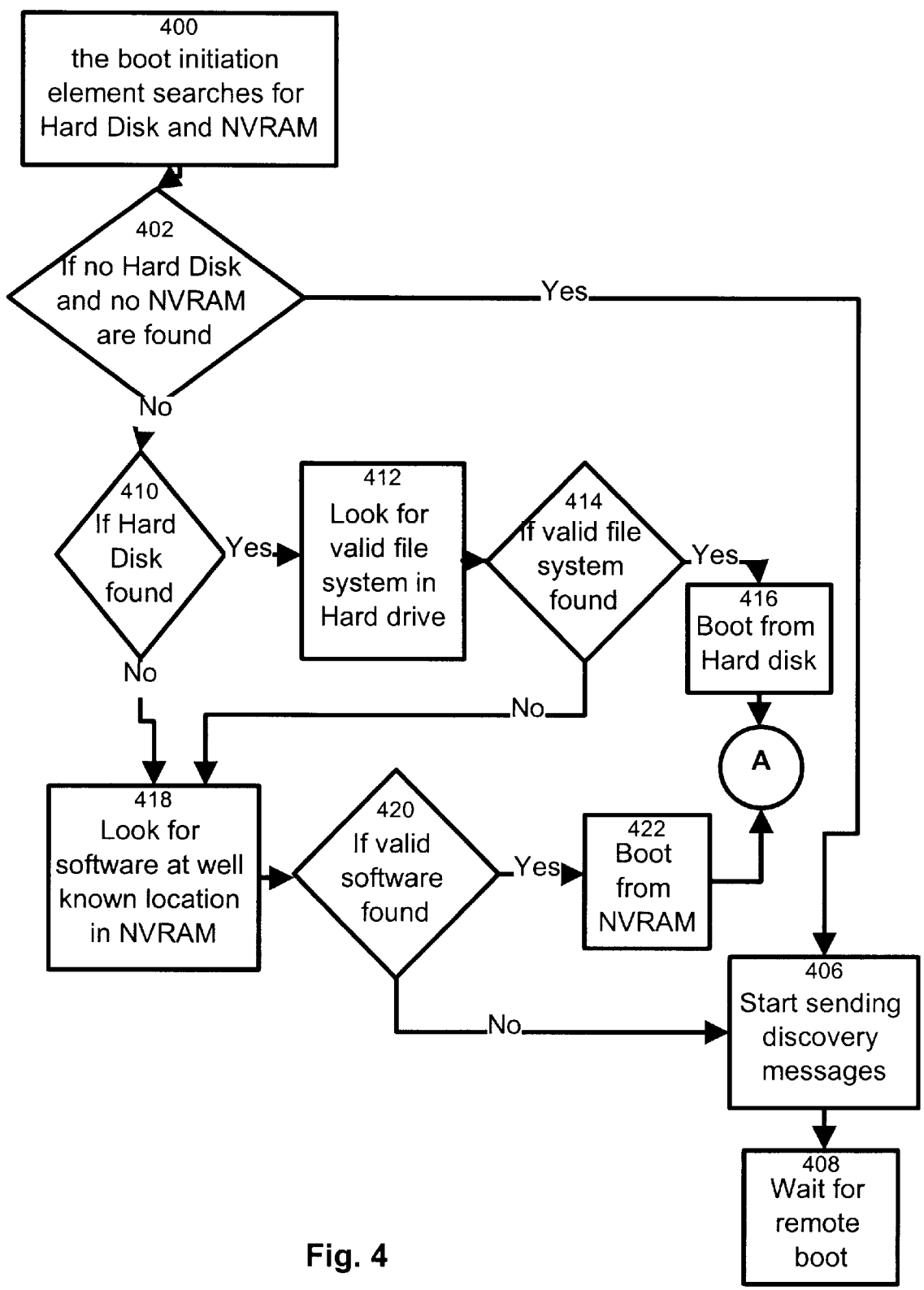
FIG. 4 shows flow-charts of the startup stage in accordance with the spirit of the invention.
Figure 5:
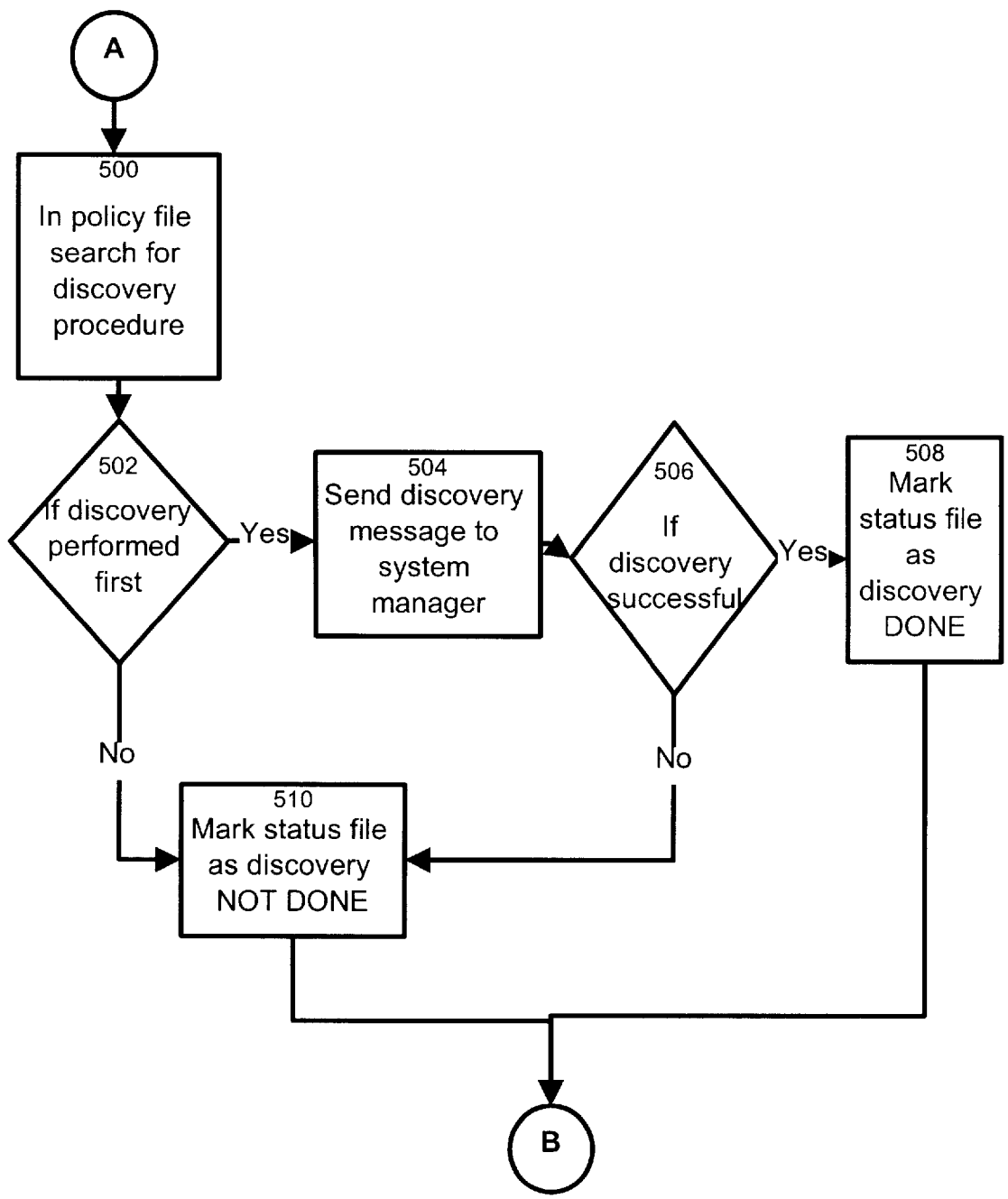
FIG. 5 & 6 shows flow-charts of the discovery stage in accordance with the spirit of the invention.

The first stage in FIG. 3, the start-up stage 301, involves the CPU of the computer upon power-up to begin executing a boot initiation element. The instructions in the boot initiation element are performed starting at a particular address of a non-volatile memory unit such as a ROM unit or other suitable devices. The purpose of the boot initiation element is to run basic sanity checks to determine all the critical components of the computer that are present, run the necessary I/O drivers and communication protocols, etc. In other words, the boot initiation element activates software components and sets-up the hardware to allow other software elements necessary to complete the boot-up procedure to run properly. In a typical flow of events, as shown in FIG. 4, when the power is first initialized in the computer, the boot initiation element code begins to execute and searches for a hard drive and a non-volatile memory unit 400. Condition 402 is checked, and if neither a hard drive nor a non-volatile memory unit are found, the boot initiation element using the ATM driver code initiates the discovery process 406 by sending a registration message to the system manager. Following this, the computer waits for a remote boot 408 and for software to be received from the network. If condition 402 is answered in the negative, condition 410 is checked. If a hard disk is found then it is searched 412 for a file system containing the files required for booting. Condition 414 is answered in the positive if a valid file system is found and the computer will boot from the hard disk 416. If conditions 410 or 414 are answered in the negative, namely if there is no hard disk or if the hard disk does not contain a valid file system, the NVRAM is searched for the software required 418 located at a well-known location. If the software is not found as checked by condition 420, the boot initiation element, using the ATM driver code, initiates the discovery process 406 by sending a registration message to the system manager. Following this, the computer waits for a remote boot 408 and for software to be received from the network. However, if condition 420 is answered in the positive, the computer will boot from the NVRAM 422. Once the source of the booting process has been selected, booting can begin as shown in FIG. 5.

Figure 6:
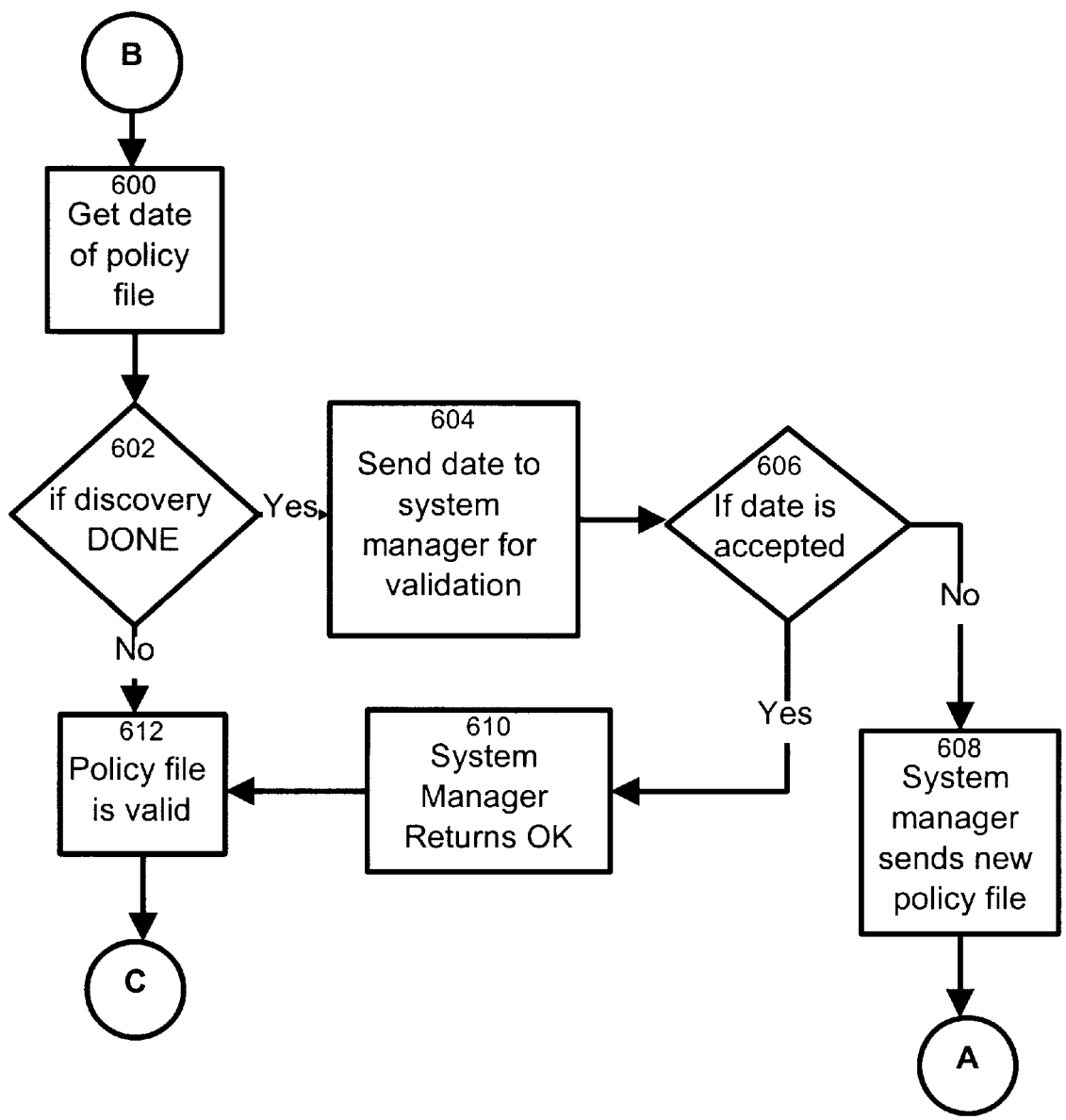

The following stage, the discovery stage 300, involves the new computer registering with the system manager through the network. Essentially, using the ATM driver, the new computer sends messages to the system manager identifying its presence and its location. The system manager typically registers the new computer node and sends an acknowledgement message. The discovery stage can be performed at any time during the booting process. For example, if the software download 302 and initialization stage 304 are to be performed locally (from the hard drive or from the NVRAM) and the datafill stage 306 needs to be done from the network, the discovery may be diferred until the datafill stage is ready to begin since the system manager doesn't need to know where the new computer is located until it must send data or messages to it. In a typical flow of events, as shown in FIG. 5, the interpreter in the boot initiation element examines the policy file 500 and determines if discovery must take place immediately. In the preferred embodiment of this invention, the policy file contains instructions of the form:

Discovery{BEFOREDISKBOOT | AFTERDISKBOOT | AFTERINITSCRIPT | AFTERDATAFILL}
Policy File Vintage{CHECK|NO CHECK} where the vertical bars indicate that only one of the options needs to be specified. If condition 502 is answered in the positive, the discovery is to be performed immediately. The boot initiation element then sends a discovery message 504 to the system manager. Condition 506 verifies if an acknowledgement message is received from the system manager indicating a successful discovery. If condition 506 is answered in the affirmative, an entry is made to a status file 508 indicating that the discovery is done. If either condition 502 or condition 506 is answered in the negative, an entry is made to a status file 510 indicating that the discovery is not done. The status file is used to maintain status information about the booting process including which stages have been performed and whether or not they were successful. The network manager can examine this file in order to obtain a "footprint" of the cause of an unexpected failure. It can also be used to verify that all the stages in the booting process were executed as specified in the policy file. In essence, the status file is there to keep a log of the booting process and is not critical in the booting process. Therefore the absence of a status file in an embodiment of this invention does not detract from the spirit of this invention. In addition to indicating if a booting stage was successful, entries in the status file may also include the number of time a certain stage has failed and whether the vintage of a given file has been verified. After steps 510 and 508 we proceed in validating the policy file as shown in FIG. 6. Preferably, every time a new file is accessed in order to obtain booting instructions, a verification operation is performed, herein referred to as checking the vintage of the file, in order to determine if the file contains the current version of the instructions. The general idea in the validation involves comparing the date of the policy file in the new computer with the date of the policy file in the system manager. If the file being verified is up to date, the system manager sends an approval message, otherwise the system manager sends an up-to-date version of the file. The first step in checking the vintage of the policy file involves extracting the date of the policy file in the new computer 600. If the discovery has been done, condition 602 is answered in the positive and the new computer sends a message to the system manager containing the date of the policy file 604. If the date of the policy file is valid, condition 606 is answered in the positive and the system manager sends a message to proceed 610, and the new computer then considers the policy file valid 612. If the discovery has not been done, condition 602 is answered in the negative and the policy file is also assumed to be valid 612. If the date of the policy file is not valid, condition 606 is answered in the negative and the system manager sends a message to the new computer along with a new policy file 608. In the case where a new policy file is sent, the system starts over (tag A) by examining the discovery convention. In the case where the policy file was valid, the system proceeds to the software download stage 302 (tag C).

Figure 7:
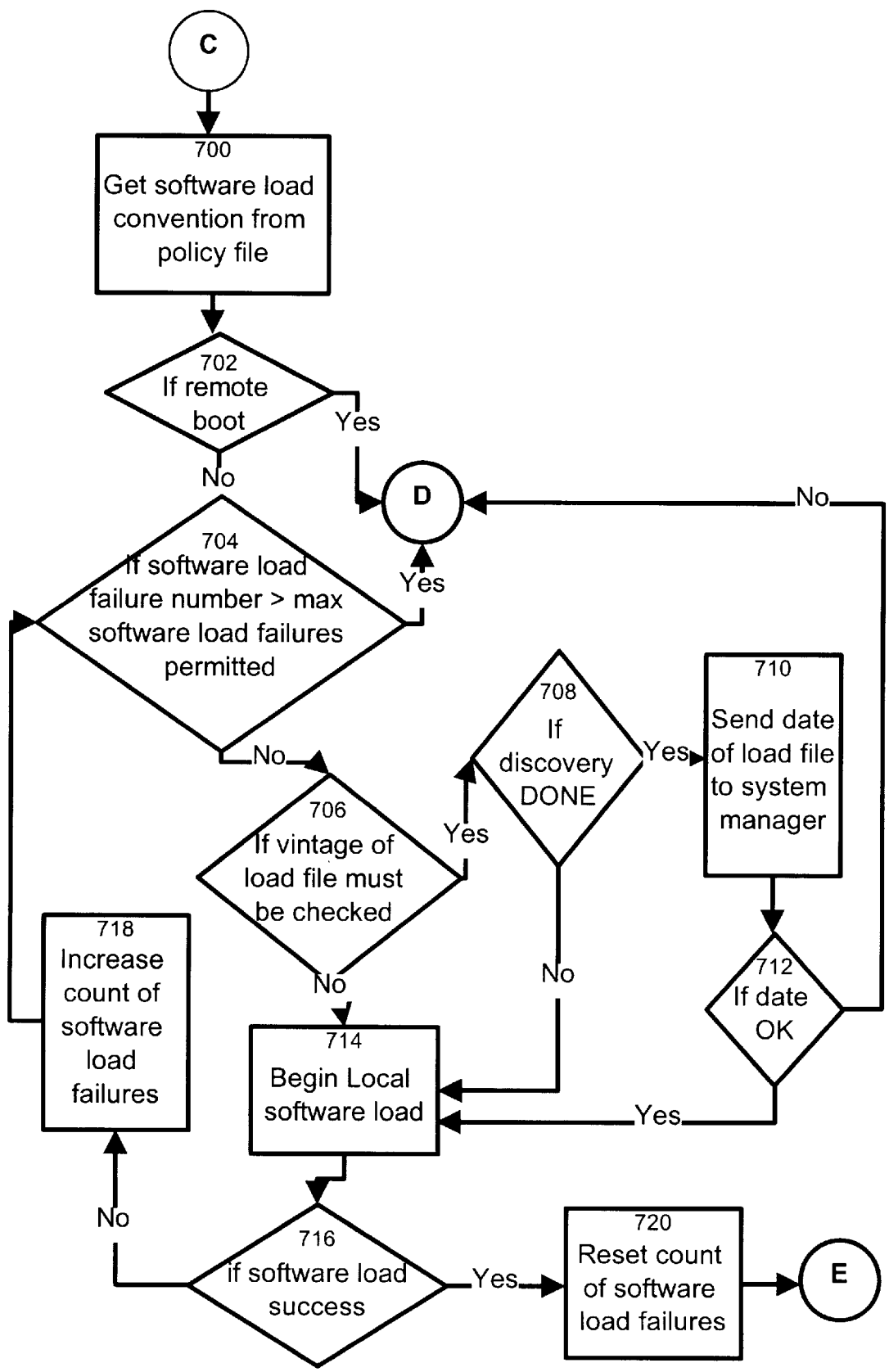
FIG. 7 & 8 show flow-charts of the software download stage in accordance with the spirit of the invention.
Figure 8:
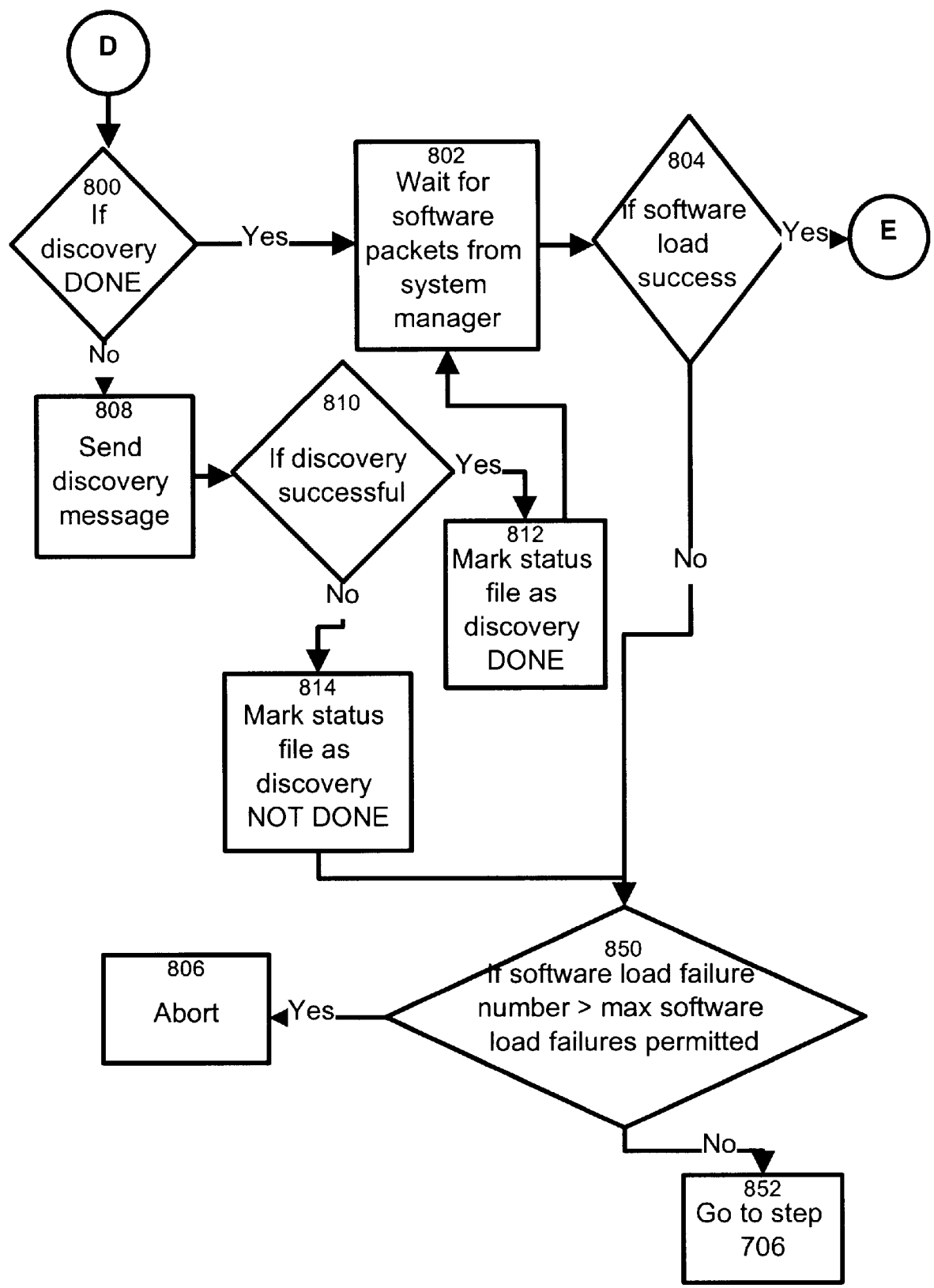

The software download stage 302 involves downloading basic software from the network. In the case where the system has a hard drive and is to obtain the software locally, this stage may involve locating the software in the local storage device, with the use of a load description file identifying the software image on the computer. Preferably the software downloaded includes software to download yet more software. The software image may include the basic operating system and a node management module. In the preferred embodiment the software load is a single executable file. Other types of files may constitute a software load without detracting from the spirit of the invention. The software load may also include a load description file that describes which software runs on a given node. Preferably, the load description file is small so that it may be easily transferred to the system manager for a vintage check. Optionally, more than one load image may be present in the software load files to accommodate operating systems with multiple address space such as UNIX. For these operating systems, separate software load files may be started in different address spaces. In a typical interaction as shown in FIG. 7, the load convention is obtained from the policy file 700 that indicates if the software load is to be obtained remotely or locally. Preferably, computers with local harddrives or NVRAMs boot locally in order to improve the speed of the booting process and the system manager only participates in the process if needed. If the software load is to be obtained locally, then condition 702 is answered in the negative. Preferably, a failure recovery mechanism is present which allows the computer to boot from an alternative memory source in the case where the preferred source designated in the policy file is unavailable. For example, if the policy file requires software or data to be obtained from a remote system manager and the latter is not accessible for whatever reason, the computer will boot from the local hard drive or NVRAM if the required software or data is valid and present. The converse is also possible, namely if the policy file requires software or data to be obtained from the local hard drive and the latter is not accessible for whatever reason, the computer will boot from the system manager if the required software or data is valid and present. In the case where both the hard drive (or NVRAM) and remote system manager are unavailable, the computer will not boot. Therefore, the computer keeps track of the number of failures. If the number of failures is below a pre-determined allowed number of failures, condition 704 is answered in the negative and the software load will be obtained from the hard disk or NVRAM. Preferably, the required information about the software load is located in a load description file that indicates which files are in the software load and what is their vintage. The policy file is then examined to determine if the vintage of the load file must be verified before proceeding. If the vintage of the load files must not be checked, condition 706 is answered in the negative and the computer proceeds in booting from the local hard-drive (or NVRAM) 714. Booting from the hard drive may include searching for predetermined files. Condition 716 verifies if the booting was a success. If the boot was a success, step 720 resets the number of boot failures to zero and proceeds to the software initialization stage (tag E). If the boot wasn't a success, condition 716 is answered in the negative and the number of failures is incremented 718. Condition 704 is then re-evaluated. If the vintage of the load file must be checked, condition 706 is answered in the positive and the computer proceeds in verifying the date of the load file. If the discovery stage has already been done, condition 708 is answered in the positive and the date of the load file is sent to the system manager 710. At condition 712 the system manager evaluates if the load file for the computer is the most up-to-date file. If the date of the load file is accepted, condition 712 is answered in the positive and the local boot can begin at step 714. If at condition 708 the discovery stage has not taken place, the condition is answered in the negative and the load file is assumed to be valid and allows the local boot to begin at step 714. The node proceeds in booting from the network (tag D) in three cases. The first case occurs if the policy file indicates that the software load must be obtained from the network causing condition 702 to be answered in the positive. The second case occurs if the local booting has failed more than a pre-determined number of times causing condition 704 to be answered in the positive. And finally, the third case occurs if the system manager did not accept the date of the load file causing condition 712 to be answered in the negative. The network booting procedure is shown in the flow chart of FIG. 8. Condition 800 is answered in the positive if the status file indicates that the discovery has been done. The computer then waits for the system manager to send packets 802 containing the software load. If the software load is a success, condition 804 is answered in the positive, the status file reflects that the software load stage was successful and the computer proceeds to the software initialization stage (tag E). However, the software load stage may fail for a number of reasons. For example, the system manager may be unavailable, the packets may have gotten lost, or the connection may have been broken. If the software load stage fails, condition 804 is answered in the negative. The computer verifies if the number of failures exceeds the number of failures permitted. If it does, condition 850 is answered in the positive and the process is aborted 806. However, if the number of failures is less than the maximum number permitted, condition 850 is answered in the negative and the computer attempts a local software load stage 852 starting at stage 706 on FIG. 7. If at condition 800 the discovery has not been done, the computer begins the discovery process by sending discovery messages 808 across the network to the system manager. If the discovery is successful, condition 810 is answered in the positive and an entry is made to the status file to indicate that the discovery has been done. The computer then waits for the system manager to send packets 802 containing file load information. In the event that the discovery fails, condition 810 is answered in the negative and an entry is made to the status file to indicate that the discovery was not done 814. The process then proceeds to condition 850.

Figure 9:
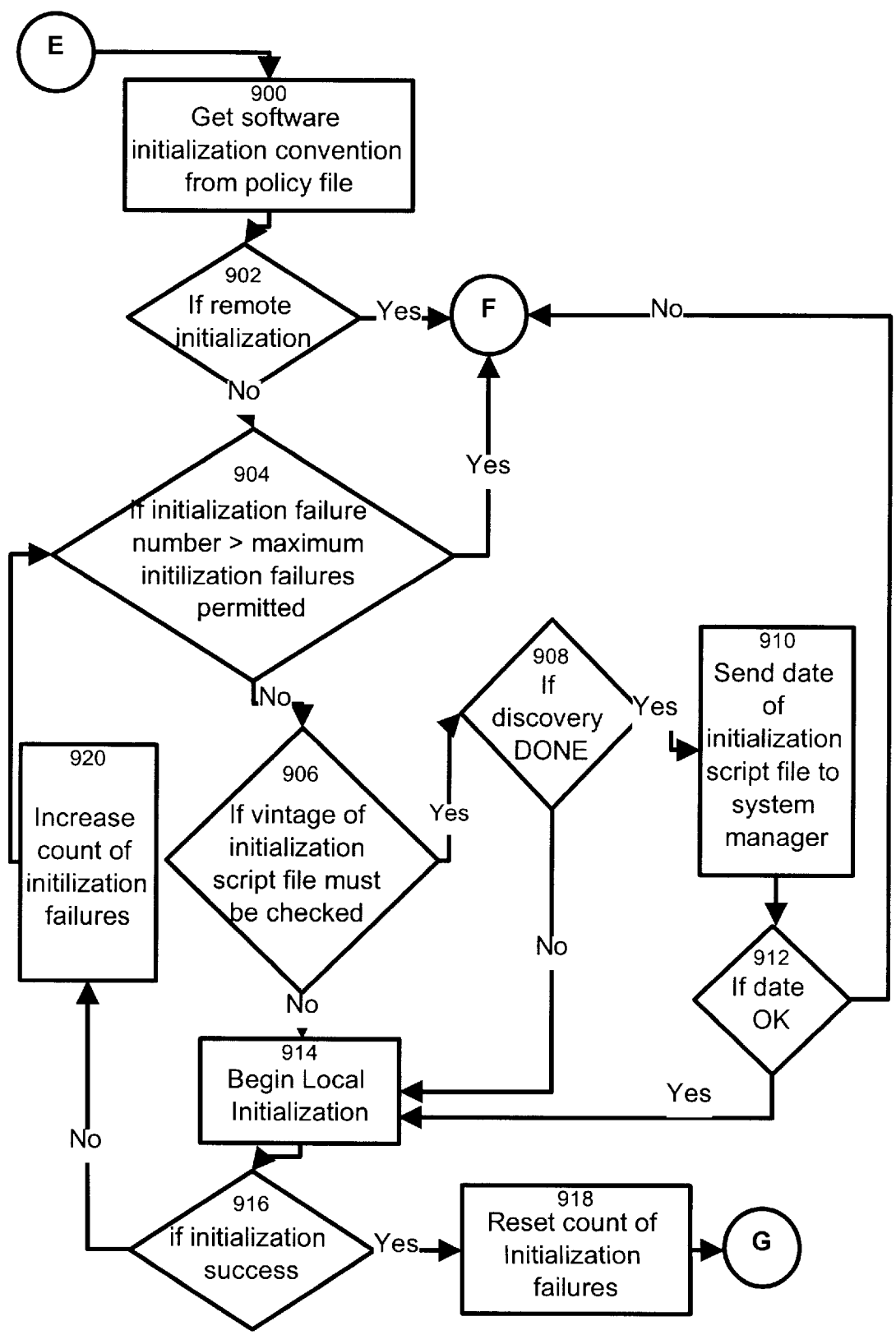
FIG. 9 & 10 show flow-charts of the software initialization stage in accordance with the spirit of the invention.
Figure 10:
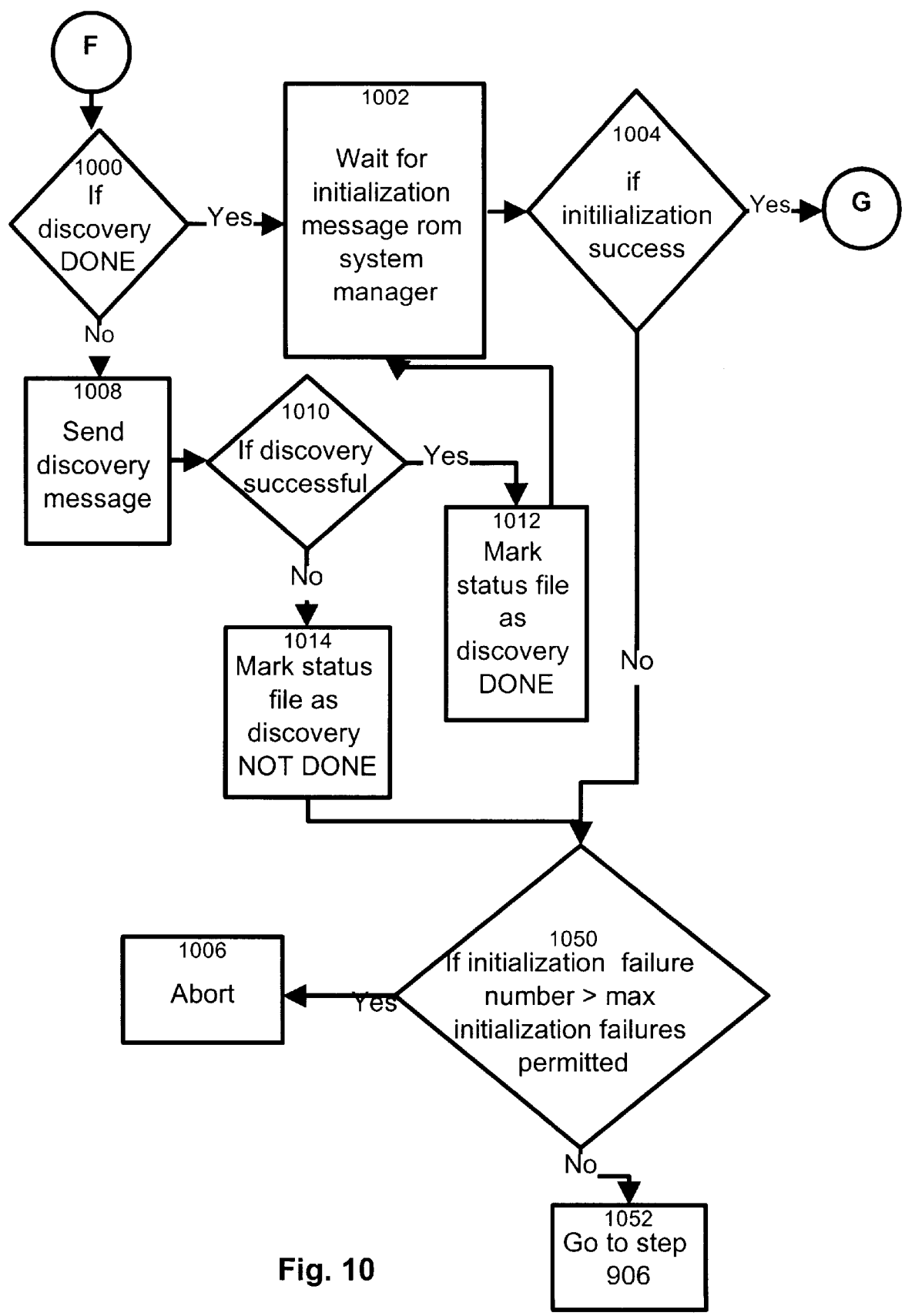

The following stage, the software initialization stage 304, involves starting and initializing part of the software received or located in the software download stage 302. Software initialization involves executing code, preferably a script file, which instructs the computer to start a set of programs or processes. The preferred embodiment of this invention uses an initialization script file. This file includes a set of commands to start or create software instances on the computer. In its simplest form, the initialization script file is a sequence of start() and create() messages sent to different components of the software load. In a typical interaction as shown in FIG. 9, the software initialization convention is obtained from the policy file 900 that indicates if the initialization script file is to be obtained remotely or locally. If the initialization script is to be obtained locally, then condition 902 is answered in the negative. The computer then checks how many times the initialization procedure has failed. If the number of failures is below a pre-determined allowed number of failures, condition 904 is answered in the negative and the initialization script will be obtained from the hard disk or NVRAM. The policy file is then examined to determine if the vintage of the initialization script file must be verified before proceeding. If the vintage of the initialization script file does not need to be checked, condition 906 is answered in the negative and the computer proceeds in executing the initialization script from the local hard-drive (or NVRAM) 914. Condition 916 verifies if the initialization was a success. If the boot was a success, step 918 resets the number of initialization failures to zero and proceeds to the datafill stage (tag G). If the initialization was not a success, condition 916 is answered in the negative and the number of failures is incremented 920. Condition 904 is then re-evaluated. Returning to condition 906, if the vintage of the initialization script file must be checked, condition 906 is answered in the positive and the computer proceeds in verifying the date of the file. If the discovery stage has already been done, condition 908 is answered in the positive and the date of the initialization script file is sent to the system manager 910. At condition 912 the system manager evaluates if the initialization script file for the computer is the most up-to-date file. If the date of the initialization script file is accepted, condition 912 is answered in the positive and the local initialization can begin at step 914. If at condition 908 the discovery stage has not taken place, the condition is answered in the negative and the initialization script file is assumed to be valid and allows the local initialization to begin at step 914. The node proceeds in initializing from the network (tag F) in three cases. The first case occurs if the policy file indicates that the initialization script file must be obtained from the network causing condition 902 to be answered in the positive. The second case occurs if the local initialization has failed more than a pre-determined number of times causing condition 904 to be answered in the positive. The third case occurs if the system manager did not accept the date of the initialization script file causing condition 912 to be answered in the negative. The network initialization procedure is shown in the flow chart of FIG. 10. Condition 1000 is answered in the positive if the status file indicates that the discovery has been done. The computer then waits for the system manager to send packets 1002 containing the initialization script and then executes the script. If the initialization is a success, condition 1004 is answered in the positive and the computer proceeds to the datafill stage (tag G). However, the initialization may fail for a number of reasons. For example, the system manager may be unavailable, the packets may have gotten lost, or the connection may have been broken. If the initialization fails, condition 1004 is answered in the negative. If the software load stage fails, condition 804 is answered in the negative. The computer then verifies if the number of failures exceeds the number of failures permitted. If it does, condition 1050 is answered in the positive and the process is aborted 1006. However, if the number of failures is less than the maximum number permitted, condition 1050 is answered in the negative and the computer attempts a local software initialization 1052 starting at stage 906 on FIG. 9. If at condition 1000 the discovery has not been done, the computer begins the discovery process by sending discovery messages 1008 across the network to the system manager. If the discovery is successful, condition 1010 is answered in the positive and an entry is made to the status file to indicate that the discovery has been done. The computer then waits for the system manager to send packets 1002 containing the initialization script and then executes the script. In the event that the discovery fails, condition 1010 is answered in the negative and an entry is made to the status file to indicate that the discovery was not done 1014. The process then proceeds to condition 1050.

Figure 11:
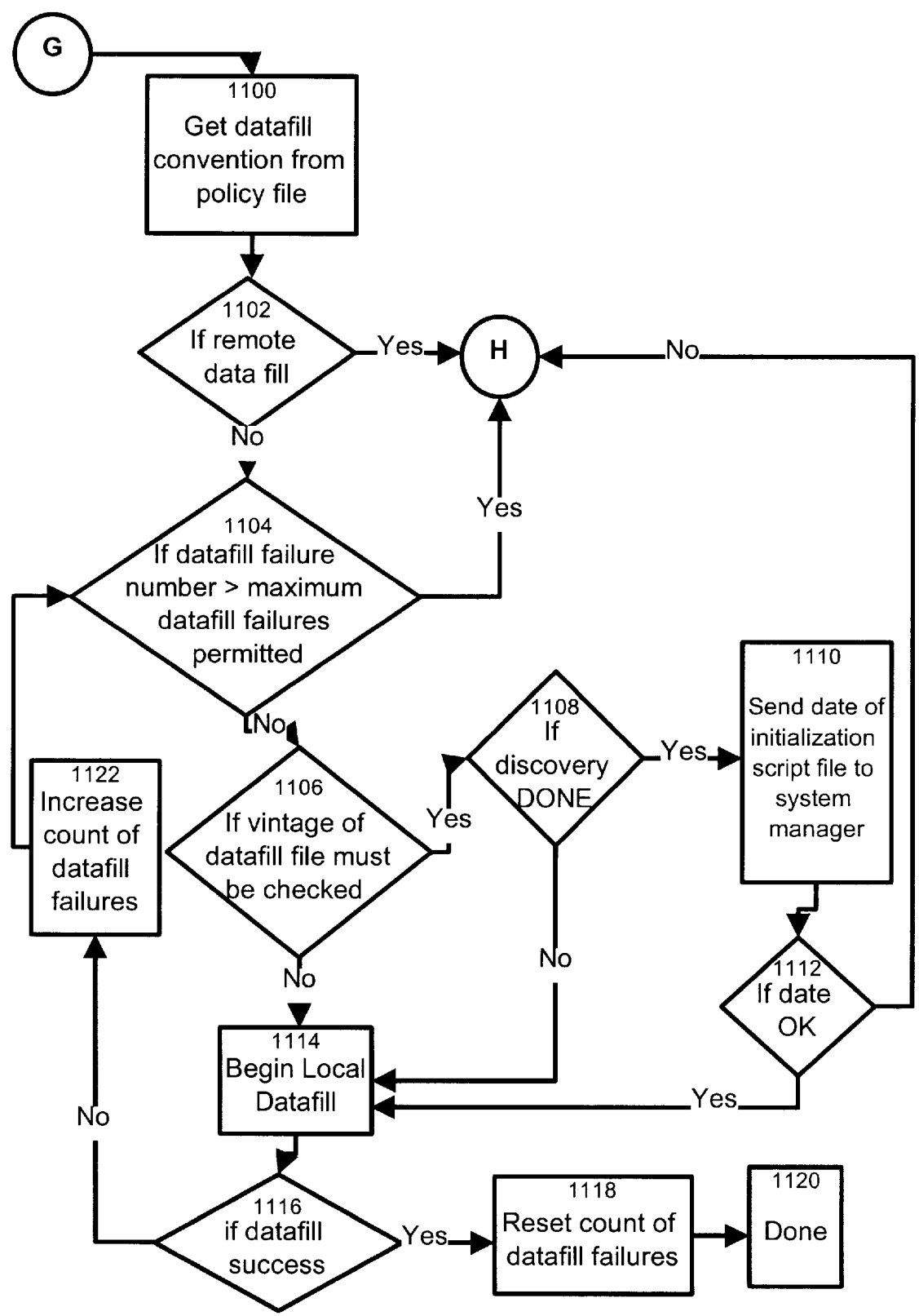
FIG. 11 & 12 show flow-charts of the datafill stage in accordance with the spirit of the invention.
Figure 12:
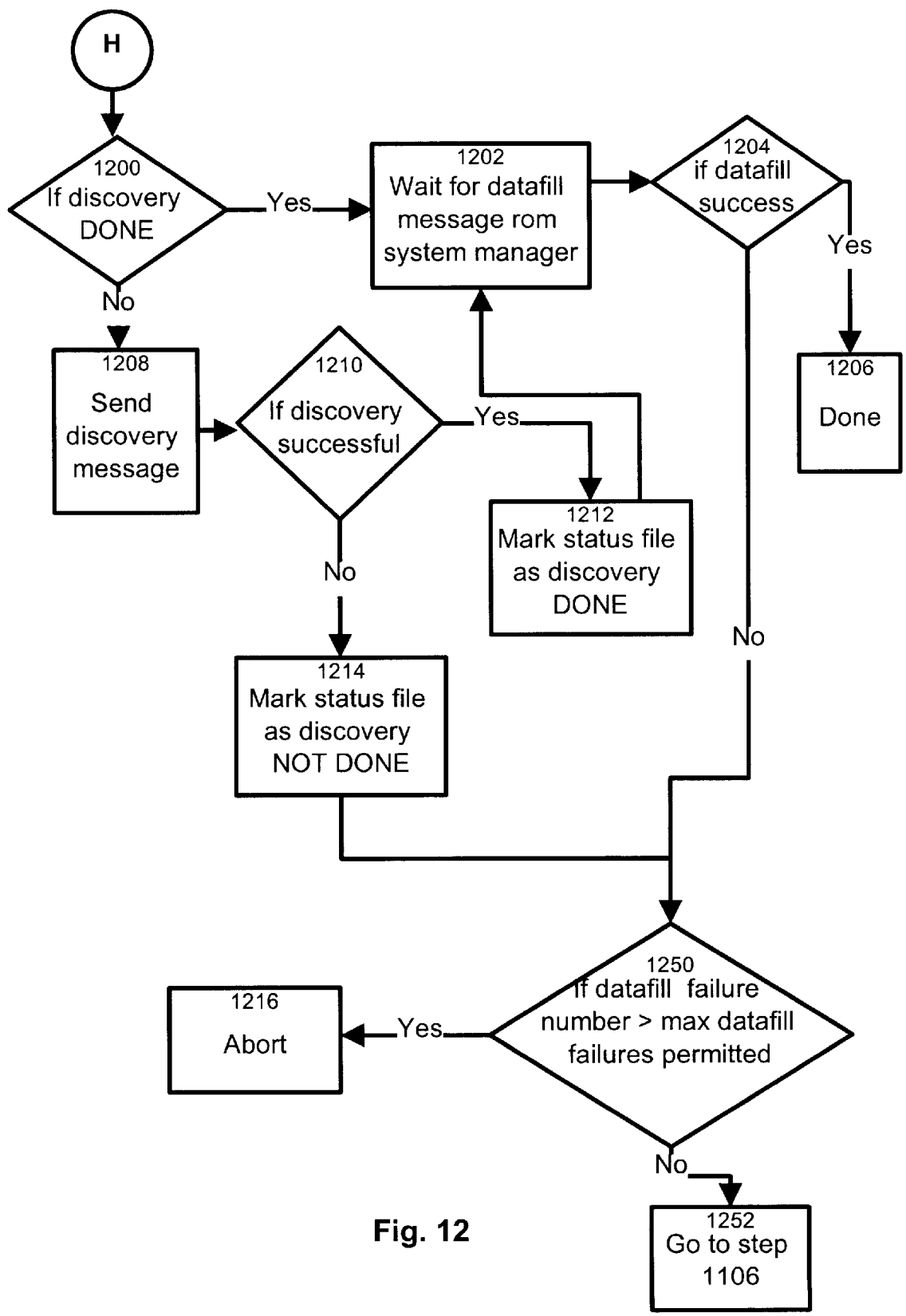

Once the software instances have been started or created through the commands of the initialization script file, the datafill stage 306 involves loading the data into the software instances initialized by the software initialization stage 304. In the preferred embodiment, a datafill file contains a sequence of instructions, herein referred to as messages, which direct the computer as to how to start the software instances. In a typical interaction as shown in FIG. 11, the datafill convention is obtained from the policy file 1100 that indicates if the datafill file is to be obtained remotely or locally. If the datafill file is to be obtained locally, then condition 1102 is answered in the negative. The computer then checks how many times the datafill procedure has failed. If the number of failures is below a pre-determined allowed number of failures, condition 1104 is answered in the negative and the datafill file will be obtained from the hard disk or NVRAM. The policy file is then examined to determine if the vintage of the datafill file must be verified before proceeding. If the vintage of the datafill file does not need to be checked, condition 1106 is answered in the negative and the computer proceeds in executing the datafill file code from the local hard-drive (or NVRAM) 1114. Condition 1116 verifies if the datafill was a success. If the datafill was a success, step 1118 resets the number of datafill failures to zero and the computer initialization is done 1120 successfully. If the datafill was not a success, condition 1116 is answered in the negative and the number of failures is incremented 1122. Condition 1104 is then re-evaluated. Returning to condition 1106, if the vintage of the datafill file must be checked, condition 1106 is answered in the positive and the computer proceeds in verifying the date of the file. If the discovery stage has already been done, condition 1108 is answered in the positive and the date of the datafill file is sent to the system manager 1110. At condition 1112 the system manager evaluates if the datafill file for the computer is the most up-to-date file. If the date of the datafill file is accepted, condition 1112 is answered in the positive and the local datafill can begin at step 1114. If at condition 1108 the discovery stage has not taken place, the condition is answered in the negative and the datafill file is assumed to be valid, the system is allowed to begin local datafill at step 1114. The computer node obtains the datafill file from the network (tag H) in three cases. The first occurs if the policy file indicates that the datafill file must be obtained from the network causing condition 1102 to be answered in the positive. The second case occurs if the local datafill has failed more than a predetermined number of times causing condition 1104 to be answered in the positive. The third case occurs if the system manager did not accept the date of the datafill file causing condition 1112 to be answered in the negative. The network datafill procedure is shown in the flow chart of FIG. 12. Condition 1200 is answered in the positive if the status file indicates that the discovery has been done. The computer then waits for the system manager to send packets 1202 containing the datafill file and then executes the code. If the datafill is a success, condition 1204 is answered in the positive and the computer has finished booting. However, the remote datafill operation may fail for a number of reasons. For example, the system manager may be unavailable, the packets may have gotten lost or the connection may have been broken. If the datafill fails, condition 1204 is answered in the negative. The computer then verifies if the number of failures exceeds the number of failures permitted. If it does, condition 1250 is answered in the positive and the process is aborted 1216. However, if the number of failures is less than the maximum number permitted, condition 1250 is answered in the negative and the computer attempts a local datafill stage 1252 starting at stage 1106 on FIG. 11. If at condition 1200 the discovery has not been done, the computer begins the discovery process by sending discovery messages 1208 across the network to the system manager. If the discovery is successful, condition 1210 is answered in the positive and an entry is made to the status file to indicate that the discovery has been done. The computer then waits for the system manager to send packets 1202 containing the datafill file and then executes the code. In the event that the discovery fails, condition 1210 is answered in the negative and an entry is made to the status file to indicate that the discovery was not done 1214. The process then proceeds to condition 1250.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. A machine-readable storage medium containing a program element for directing a computer to effect a multi-stage boot-up procedure from power-up, said multi-stage boot-up procedure including a first stage and a plurality of successive stages following said first stage, the implementation of the stages subsequent to the first stage being effected by executing respective program code units, said program element including:

a boot initiation program module for execution by the computer to implement a first stage of said boot-up procedure;

a policy file operative for directing execution of stages subsequent to the first stage of said boot-up procedure, said policy file having a plurality of entries, each entry pointing to a location containing a program code unit suitable for execution by the computer to implement a respective stage of said multi-stage boot-up procedure, at least one entry pointing toward a location containing a first program code unit residing locally at the computer and at least another entry pointing toward a location containing a second program code unit residing at a site remote from the computer, the first program code unit being associated with a stage of the boot-up procedure that occurs subsequently to the first stage, the first program code unit residing locally at the computer prior to the execution of the first stage.

2. A machine-readable storage medium as defined in claim 1, wherein said boot initiation program module is capable of interacting with at least one of entry in said policy file.

3. A machine-readable storage medium as defined in claim 2, wherein said boot initiation program module is operative for searching locally at the computer for a memory unit.

4. A machine-readable storage medium as defined in claim 3, wherein said boot initiation program module is operative for searching the memory unit for program code units.

5. A machine-readable storage medium as defined in claim 2, wherein said boot initiation program module is operative for establishing a data exchange transaction between the computer and the site remote from the computer.

6. A machine-readable storage medium as defined in claim 5, wherein said policy file includes a first entry, said boot initiation program module being operative to process the first entry to issue a message to the site remote from the computer.

7. A machine-readable storage medium as defined in claim 6, wherein said policy file includes a second entry indicative of a location where program code units associated to a given stage reside.

8. A machine-readable storage medium as defined in claim 7, wherein said boot initiation program module is operative for processing said second entry to determine the location where the program code unit associated to a given stage resides.

9. A machine-readable storage medium as defined in claim 8, wherein upon occurrence of a failure of an attempt for processing the program code unit at a location pointed to by said second entry, said boot initiation program module is operative to process a program code unit at another location.

10. A machine-readable storage medium as defined in claim 9, wherein said second entry points locally at the computer and said another location is a site remote from the computer.

11. A machine-readable storage medium as defined in claim 9, wherein said second entry points toward a site remote from the computer and said another location is locally at the computer.

12. A machine-readable storage medium as defined in claim 5, wherein said boot initiation program module is operative for establishing a data exchange transaction to verify a vintage associated to said policy file, the vintage comprising at least one data element indicative of a time characteristic.

13. A machine-readable storage medium as defined in claim 2, wherein said policy file is a script file, said script file including a plurality of entries, at least one of said entries directing said boot initiation program module to execute a given program code unit.

14. A machine-readable storage medium as defined in claim 13, wherein said given program code unit is a software download file.

15. A machine-readable storage medium as defined in claim 13, wherein said given program code unit is a datafill file, sa datafill file including a plurality of entries, at least one of said en tries directing said computer to transfer data to a certain file other than said datafill file.

16. A method for effecting a boot-up procedure of a computer, said boot-up procedure including a first stage and a plurality of successive stages following said first stage, the stages subsequent to the first stage being effected by executing respective program code units, said method comprising the steps of:

a) providing a policy file having a plurality of entries, each entry pointing to a location containing a program code unit suitable for execution by the computer to implement a respective stage of said boot-up procedure, at least one entry pointing toward a location containing a first program code unit residing locally at the computer and at least another entry pointing toward a location containing a second program code unit residing at a site remote from the computer, the first program code unit being associated with a stage of the boot-up procedure that occurs subsequently to the first stage, the first program code unit residing locally at the computer prior to the execution of the first stage;

b) initiating a first stage of said boot-up procedure;

c) processing said policy file to determine a location associated to a given program code unit for effecting a certain stage subsequent to the first stage;

d) accessing said given program code unit at the location determined at step c);

e) processing said given program code unit to cause execution of the certain stage of said boot-up procedure.

17. A method as defined in claim 16, wherein at least one entry in said policy file influences the execution of a stage subsequent to the first stage.

18. A method as defined in claim 17, comprising the step of searching locally for a memory unit.

19. A method as defined in claim 18, comprising the step of searching said memory unit for program code units.

20. A method as defined in claim 17, comprising the step of establishing a data exchange transaction between the computer and the site remote from the computer during execution of either stage of the plurality of stages of said boot-up procedure.

21. A method as defined in claim 20, wherein said policy file includes an entry indicative of a location where a given program code unit resides.

22. A method as defined in claim 21, comprising the step of processing said entry to determine the location where said given program code unit resides.

23. A method as defined in claim 22, comprising the step of attempting to process said given program code unit at the location pointed to by said second entry, upon occurrence of a failure of an attempt to process said given program code unit, attempting to process a program code unit at an another location.

24. A method as defined in claim 23, wherein said second entry points locally at the computer and said another location is a site remote from the computer.

25. A method as defined in claim 23, wherein said second entry points toward a site remote from the computer and said another location is a local site.

26. A method as defined in claim 20, comprising the step of establishing a data exchange transaction between the computer and the site remote from the computer to verify a vintage associated to said policy file, the vintage comprising at least one data element indicative of a time characteristic.

27. A computing apparatus, comprising:
   a processor;
   a memory holding a program element for directing said processor to execute a multi-stage boot-up procedure of said computing apparatus, said multi-stage boot-up procedure including a first stage and a plurality of successive stages subsequent to the first stage, the implementation of the stages subsequent to the first stage being effected by executing respective program code units, said program element implementing a boot initiation program module for execution by the computing apparatus to implement the first stage of said boot-up procedure;
   a policy file in said memory, said policy file having a plurality of entries, each entry pointing to a location containing a program code unit suitable for execution by the computer to implement a respective stage of said multi-stage boot-up procedure, at least one entry pointing toward a location containing a first program code unit residing locally at the computer and at least another entry pointing toward a location containing a second program code unit residing at a site remote from the computer, the first program code unit being associated with a stage of the boot-up procedure that occurs subsequently to the first stage, the first program code unit residing locally at the computer prior to the execution of the first stage.

* * * * *